(12) United States Patent
Wu et al.

(10) Patent No.: US 6,422,757 B1
(45) Date of Patent: Jul. 23, 2002

(54) ACTIVE PIEZOELECTRIC SPINDLE BEARING PRELOAD ADJUSTMENT MECHANISM

(75) Inventors: Tung-Chuan Wu, Hsinchu; Jih-Jong Hsu; Kuan-Wen Chen, both of Taichung; Tsann-Huei Chang, Hsinchu, all of (TW)

(73) Assignee: Industrial Technology Research Inst., Hsinchu (TW)

( * ) Notice: Subject to any disclaimer, the term of this patent is extended or adjusted under 35 U.S.C. 154(b) by 68 days.

(21) Appl. No.: 09/736,222

(22) Filed: Dec. 15, 2000

(51) Int. Cl.⁷ .............................. F16C 17/24
(52) U.S. Cl. ........................ 384/517; 384/1
(58) Field of Search ............... 384/517, 1, 563, 384/518, 519

(56) References Cited

U.S. PATENT DOCUMENTS 4,850,719 A * 7/1989 Moseley et al. ............ 384/517
5,564,840 A * 10/1996 Jurras et al. ................ 384/517
6,174,084 B1 * 1/2001 Pauwels et al. ............. 384/43

* cited by examiner

*Primary Examiner*—Lenard A. Footland
(74) *Attorney, Agent, or Firm*—Bacon & Thomas, PLLC

(57) ABSTRACT

An active piezoelectric spindle bearing preload adjustment mechanism includes a preload adjustment assembly located between an inner ring and an outer ring of two bearings, and an internal generator mounted at a selected location in a spindle. The preload adjustment assembly includes a spacer ring set and a piezoelectric actuator located in the spacer ring set. The rotation speed of the spindle is changeable to enable the internal generator generating selected amount of power and voltage for controlling extension or contraction length of the piezoelectric actuator whereby to change slide distance between the inner and outer ring for controlling bearing preload value.

10 Claims, 6 Drawing Sheets

ACTIVE PIEZOELECTRIC SPINDLE BEARING PRELOAD ADJUSTMENT MECHANISM

BACKGROUND OF THE INVENTION

This invention relates to an active piezoelectric spindle bearing preload adjustment mechanism and particularly a mechanism that is capable of generating electric power through rotation of the shaft in the a spindle to control the contracted deformation of a piezoelectric material for adjusting bearing preload alteration Increasing demands for machining precision on machine tools and great expansion of machining applications have created a lot of challenge to the fabrication of high-speed spindle. One of the manufacturing issues pending to be resolved is the generation of thermo power efficiency of the spindle. For instance, the thermo source originated from a driving motor and preload friction of the rotating elements such as bearing increases rapidly when rotation speed accelerated. Furthermore, high-speed rotation of the spindle generates centrifugal force which makes bearing components such as inner and outer rings and steel balls squeezing against each other and produces thermal stress which in turn increases bearing preload. The increased bearing preload further makes the rotating bearing generating even more thermo energy. This vicious cycle thus makes bearing internal thermo energy increasing at accelerating rate and may make bearing preload become exceedingly high. If increasing of bearing preload is done without proper control of thermal stress, the bearing would be eventually burned out and destroyed. Bearing service life and durability will be suffered.

Hence how to reduce the increase of spindle bearing preload caused by thermal expansion is an important issue in the research and development of high-speed spindle technology. Many new technologies regard bearing preload adjustment have been announced and introduced over the years. In general, bearing preload method may be categorized in three types, i.e. fixed position preload, constant pressure preload and variable preload.

In the fixed position preload technique, a fixed dimension element such as spacer ring is disposed between the bearing and a stationary block. The spacer ring presses the bearing to provide the bearing a selected preload for increasing the rigidity and supporting capacity of the spindle. When the spindle rotates at a relatively low speed, this type of preload technique may provide the spindle a desirable rigidity. However when the spindle rotates at high speed, temperature will increase and may result in thermal expansion and preload overshoot and causes bearing failure.

In the constant pressure preload technique, the spindle is subjected to a constant axial pressure for providing the spindle a desirable preload. Using spring to render the preload to the spindle is a commonly used method for high-speed spindle at present. The spring can provide a constant preload. When bearing preload changes due to the factors such as rotation speed change or temperature increase, the spring may absorb the excess preload by its small displacement and almost does not increase preload value. However when using this method for preloading spindle bearing of machine for low speed and heavy duty machining work, the spring cannot provide the bearing sufficient load to increase the rigidity and supporting capacity of the spindle. Not enough rigidity will affect machining precision. Hence spring preload is only suitable for high-speed spindle.

Variable preload technique is to overcome the disadvantage of rigidity inadequacy of the spring preload mechanism. One of the variable preload techniques is using clutch principle by adapting the constant position and constant pressure mechanism on the spindle bearing. When the spindle rotates at low speed, the clutch is actuated to switch to the fixed position preload mechanism for providing the bearing a higher rigidity and supporting capacity. When the spindle rotates at high speed, switch to the constant pressure preload mechanism for providing the bearing a lower preload to prevent spindle rigidity overshoot. This technique is simpler and easier to implement. However it needs more space. Moreover, precision control is difficult. Hence it is not commercially available at present. Another variable preload technique is hydraulic preload mechanism which is widely used now. FIG. 1 illustrates its main features. There is a hydraulic cylinder assembly 2 engaging with the spindle 1 externally. The piston rod 21 can move reciprocally to control the axial displacement of the outer ring 111 of the bearing 11 for controlling the bearing preload. This technique needs an additional hydraulic source and other peripheral equipment. It costs higher and also needs a lot of space. The design of the spindle 1 has to include many more factors. Furthermore, preload level of the hydraulic preload mechanism is easily affected by pressure pulse. Once hydraulic source is not effective, the preload value will change significantly and may result in damaging the spindle 11.

FIGS. 2 and 3 show another known technology. It is an externally powered piezoelectric type preload control mechanism which has a piezoelectric material 3. When the piezoelectric material 3 subjects to an electric field, it will extend slightly along the electric field direction for controlling bearing preload. When the shaft 12 rotates at low speed, external power source provides a higher DC voltage for the piezoelectric material 3 to extend axially and push a preload adjustment block 4 for changing bearing 11 slide distance whereby providing sufficient bearing preload to maintain the rigidity of the shaft 12. When shaft 12 rotation speed and temperature increase, the external powered voltage is gradually decreased to reduce the extension of the piezoelectric material 3. In order to control bearing preload properly, bearing preload output value should be measured constantly by using a measuring device such as load cells made from strain gauge. Then a computer will be used to control the DC voltage and feedback to the piezoelectric material 3 for a close loop control process to adjust the bearing preload. This mechanism needs expensive external control devices and has a very complex structure. It becomes a roadblock to commercialization.

SUMMARY OF THE INVENTION

In view of aforesaid disadvantages, it is therefore an object of this invention to dispose a preload control assembly and an internal generator inside a spindle that are able to automatically adjust bearing preload according to spindle rotation speed without external control systems to measure and adjust preload output value whereby to increase reliability at a lower cost.

Another object of this invention is to enable the spindle to generate electric power during rotation so that the mechanism may function without external power supply and may reduce the costs of peripheral devices. It is also more environment friendly.

Still another object of this invention is to dispose the mechanism inside the spindle so that no additional space is needed.

In order to achieve aforesaid objects, this invention provides a preload adjustment assembly between the inner ring and outer ring of two bearings and has an internal generator disposed at a selected location in the spindle. The preload adjustment assembly includes a spacer ring set and a piezoelectric actuator located in the spacer ring set. When the spindle rotates, the internal generator produces electric power resulting from the spindle rotation and provides a voltage for controlling piezoelectric actuator extension length whereby to change slide distance of the inner and outer ring for controlling the preload value.

BRIEF DESCRIPTION OF THE DRAWINGS

The invention, as well as its many advantages, may be further Understood by the following detailed description and drawings, in Which.

DESCRIPTION OF THE PREFERRED EMBODIMENTS

Figure 1:
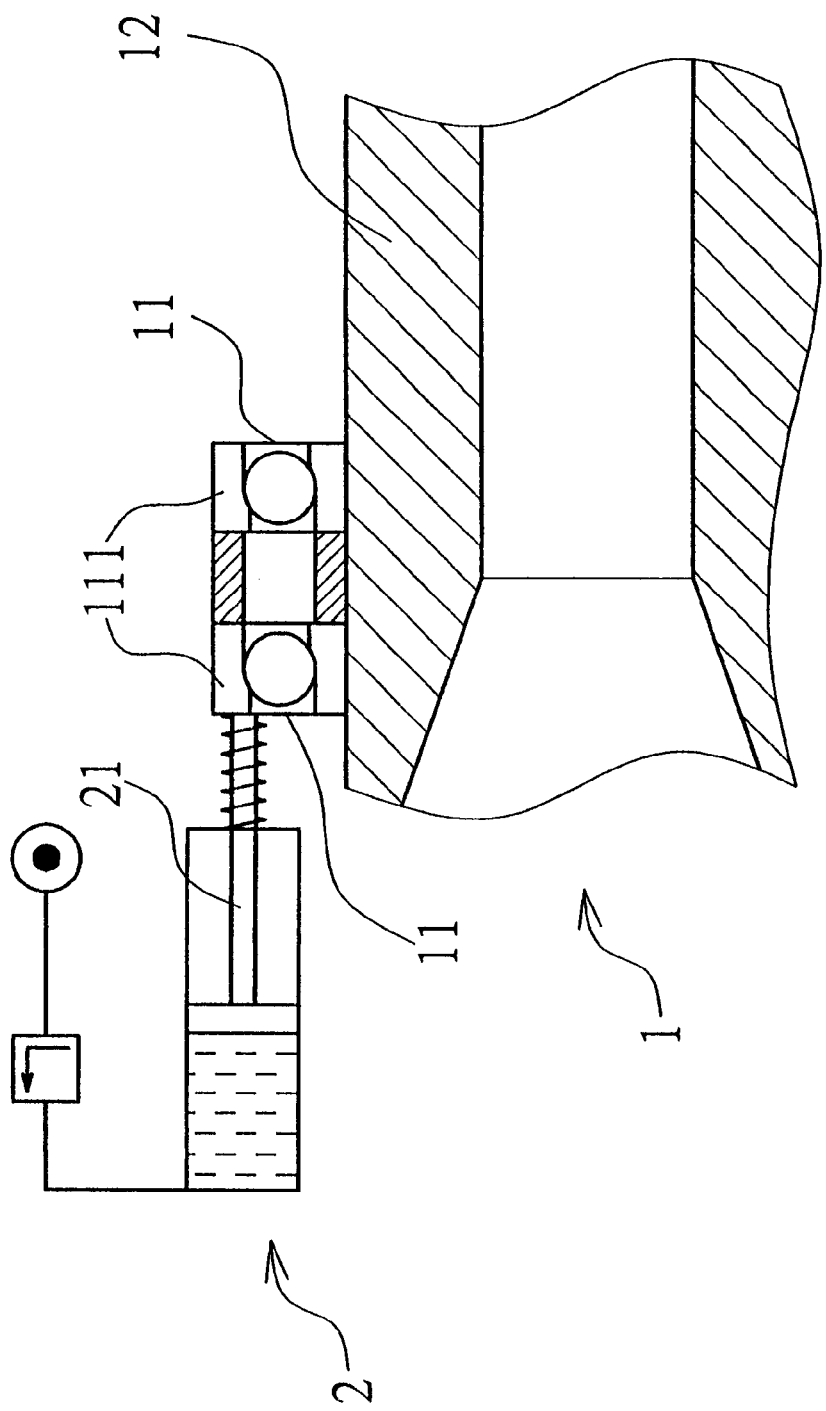
FIG. 1 is a fragmentary schematic sectional view of a conventional hydraulic preload control mechanism.
Figure 2:
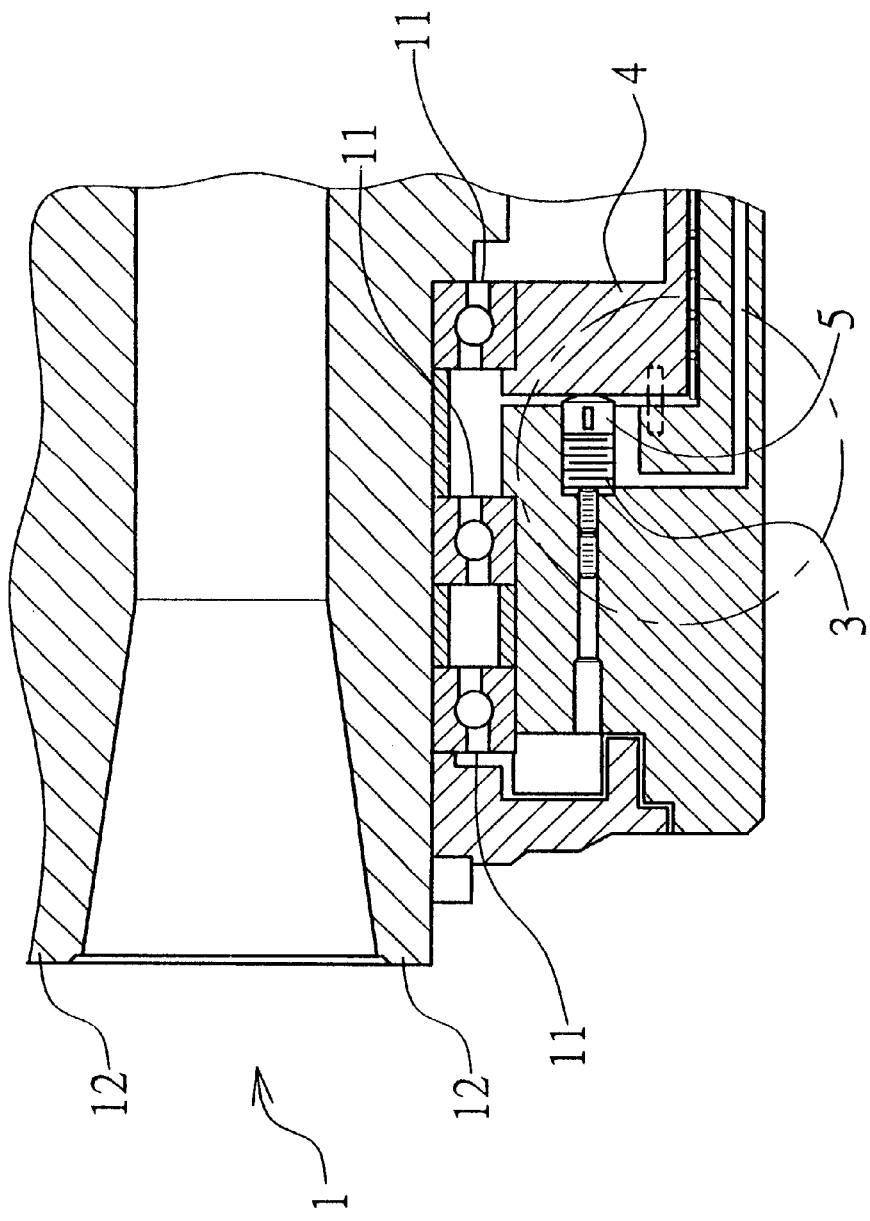
FIG. 2 is a fragmentary schematic sectional view of a conventional piezoelectric type preload control mechanism..
Figure 3:
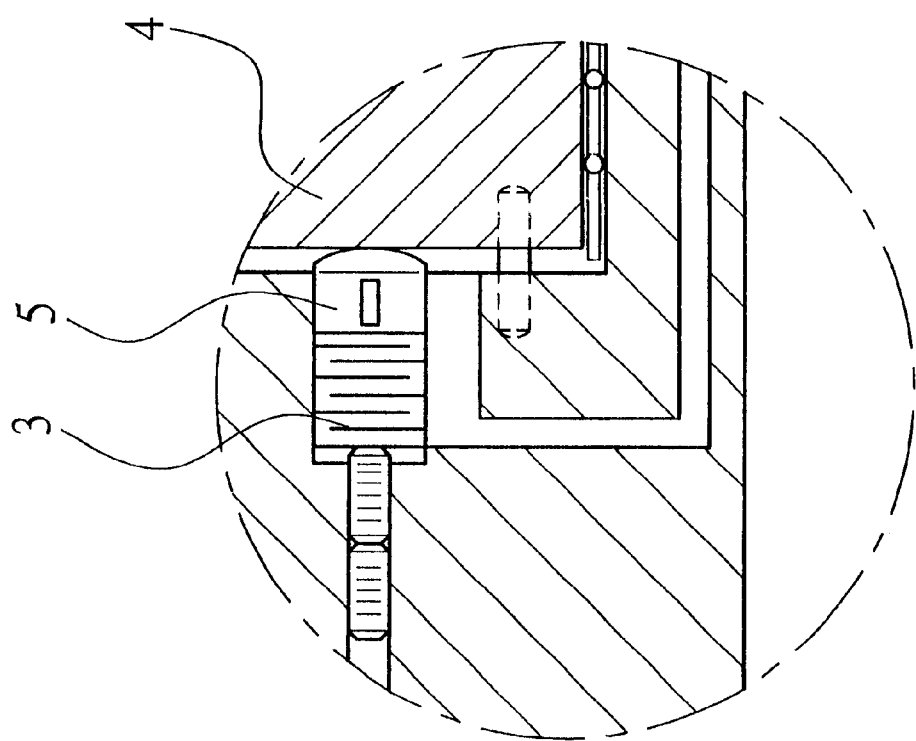
FIG. 3 is an enlarged fragmentary sectional view according to FIG. 2.
Figure 4:
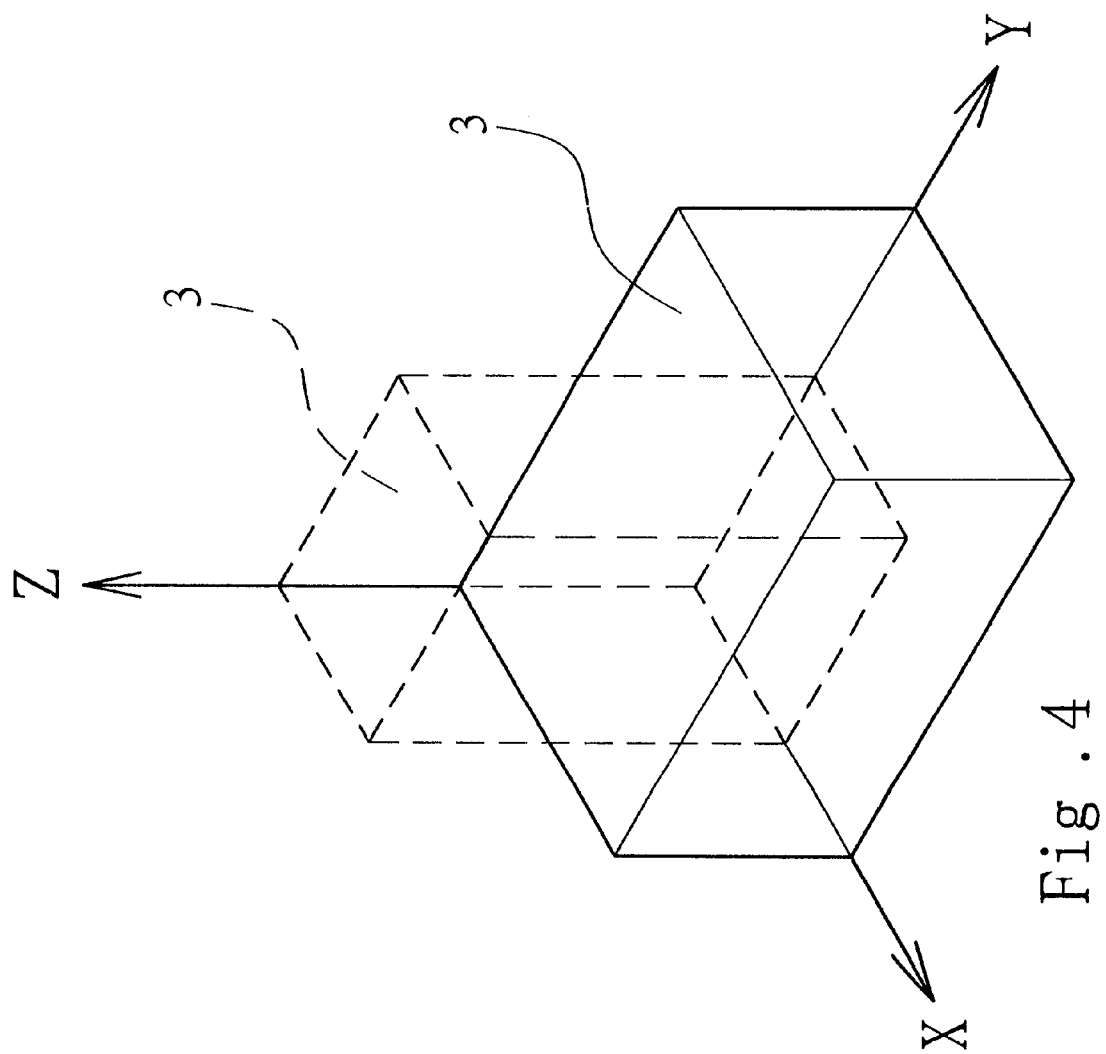
FIG. 4 is a schematic view showing the relationship of electric field and strain of piezoelectric material.

Referring to FIG. 4, applying an electric field to a piezoelectric material 3 usually will cause the piezoelectric material 3 to produce a small displacement. Their relationship may be calculated by the following equation:

$$d=\epsilon/E$$

where: d is piezoelectric constant, $\epsilon$i s strain value,

E is electric field applied to the piezoelectric material 3 Based on above equation, a greater value of d means that strain has a higher sensitivity in the electric field. In the general applications of piezoelectric material 3, most considerations are focusing on extension deformation application along the electric field direction, and neglect the contraction of the piezoelectric material 3 in the direction normal to the electric field.

Referring to FIG. 4, in the coordinates composed of XYZ axes, when an electric field is applied to a piezoelectric material 3 at the Z-axis direction, the piezoelectric material 3 will produce an extension in the electric field direction (i.e. Z-axis direction), and will have contraction in the X and Y-axes directions (shown by phantom lines). This invention uses the contraction deformation characteristics of the piezoelectric material 3 to control bearing preload.

Figure 5:
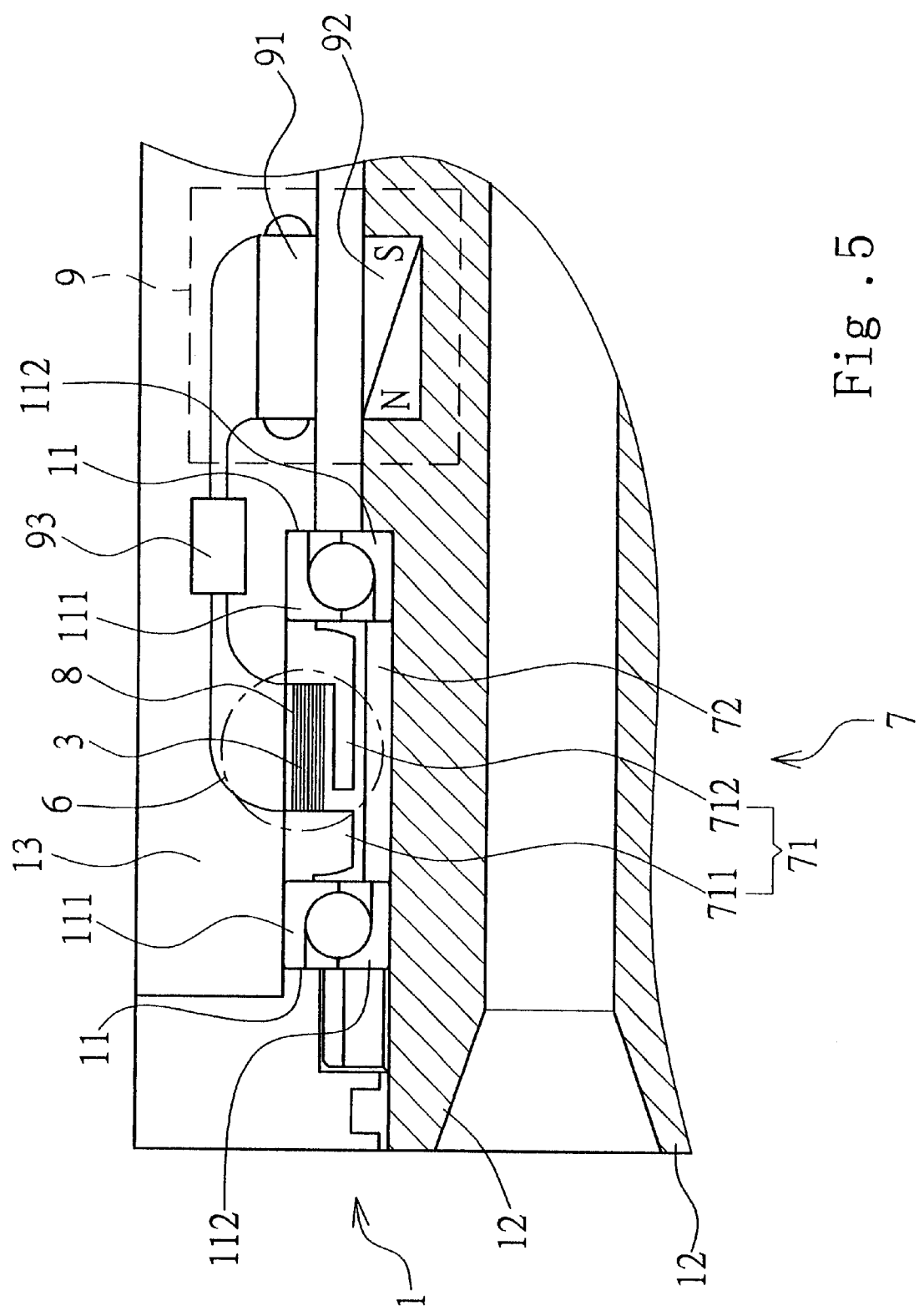
FIG. 5 is a schematic sectional view of this invention.
Figure 6:
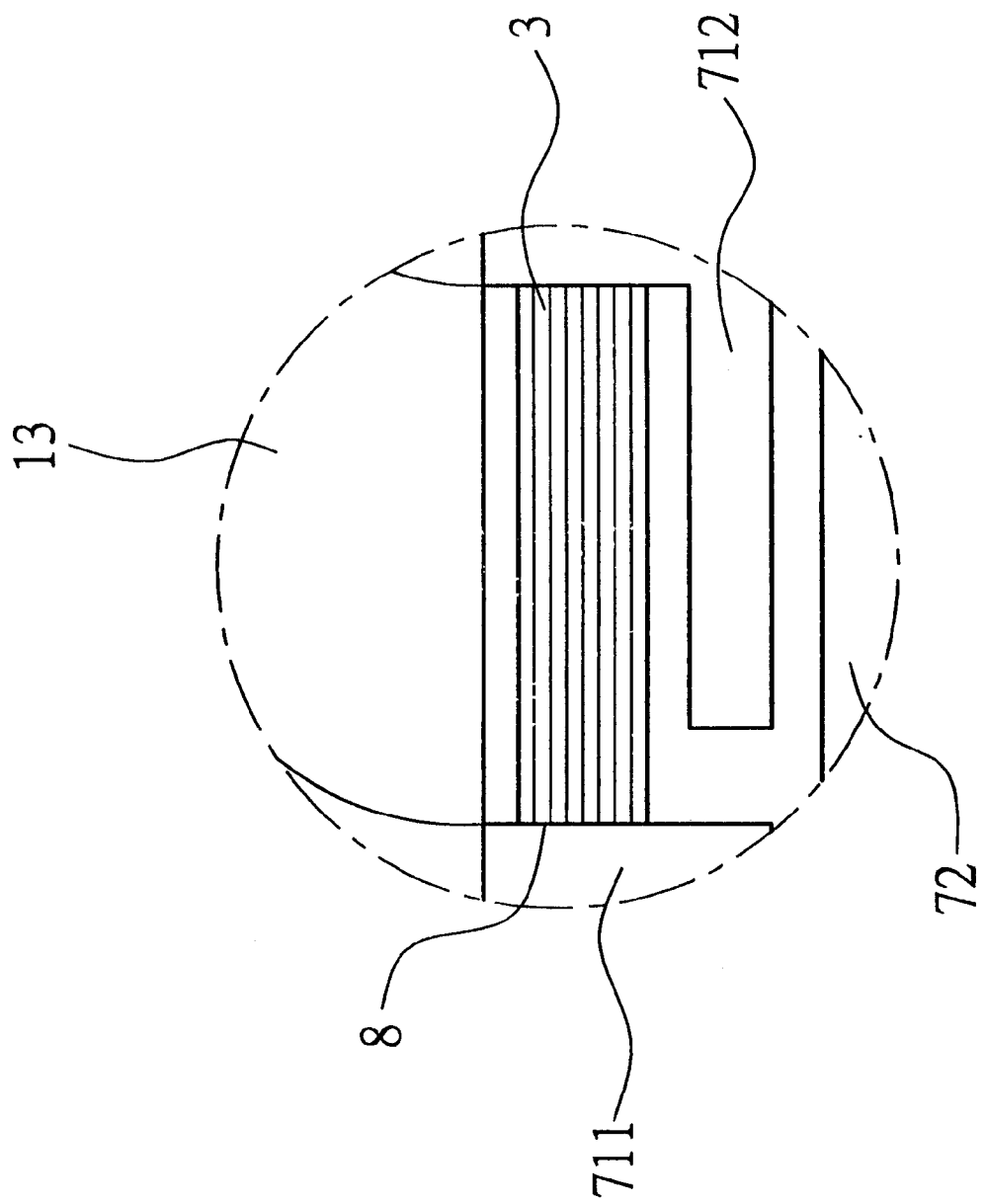
FIG. 6 is an enlarged fragmentary sectional view of this invention according to FIG. 5.

Referring to FIG. 5, this invention includes two main portions. The first portion includes a preload adjustment assembly 6 located between a bearing outer ring 111 and a bearing inner ring 112 of two sets of bearing 11 which are mounted on a spindle 1 in a back-to-back assembly fashion. The preload adjustment assembly 6 includes a spacer ring set 7 and a piezoelectric actuator 8 located in the spacer ring set 7. The piezoelectric actuator 8 includes a plurality of thin-flake-shaped piezoelectric material 3 stacked one upon the other. The spacer ring 7 includes a first spacer ring 71 and a second spacer ring 72 which have a selected gap formed therebetween. The first spacer ring 71 includes a first ring 711 and a second ring 712. The second ring 712 has an extended flange at the bottom thereof to form a compartment with the first ring 711 for holding the piezoelectric actuator 8 therein. The first and second ring 711 and 712 and the piezoelectric actuator 8 sandwiched therebetween have a longer axial length than the back-to-back assembly interval between the two outer rings 111, whereby provides an axial thrust force to press the spacer ring set 7 between the back-to-back assembly of the bearing 11. The piezoelectric actuator 8 has a smaller compartment space in radial direction of the bearing 11 than the compartment radial space between the first and second ring 711 and 712. Hence there is a selected radial gap when the piezoelectric actuator 8 is held between the first and second ring 711 and 712.

The second portion includes a rotary shaft 12 located in the spindle 1 and an internal generator 9 disposed at a selected location in a stationary spindle front block 13. The generator 9 includes a coil 91 and a permanent magnet 92 and is wired to a semiconductor rectifier 93. The permanent magnet 92 is located on the shell of the shaft 12. The coil 91 is located in the spindle front block 13 mating against the permanent magnet 92. The semiconductor rectifier 93 has one end electrically connecting with the coil 91 and another end electrically connecting with the piezoelectric actuator 8, whereby the coil 91, semiconductor rectifier 93 and piezoelectric actuator 8 form a loop. When the permanent magnet 92 rotates along with the shaft 12, the coil 91 forms a rotational magnetic field and result in change of magnetic flux in the coil 91, consequently generate induction current and voltage in the coil 91. The variation of current is rectified through the semiconductor rectifier 8 to become DC current and input to the piezoelectric actuator 8, and generates an electric field in the piezoelectric actuator 8 along the radial direction of the bearing 11, whereby the piezoelectric actuator 8 produces an extension along the bearing 11 radial direction and a contraction along the bearing 11 axial direction. When the shaft 12 rotation speed increases, output voltage from the coil 91 will also increase. In the mean time, the electric field intensity along the bearing 11 radial direction also increases.

By means of aforesaid structure, the spacer ring set 7 is compressed at the bearing 11 axial direction between the back-to-back assembly of the bearing 11, and may provide the shaft 12 an initial bearing preload when the shaft 12 starts rotation at a low speed (such as for heavy duty machining at low speed) so that the shaft 12 will have greater rigidity and supporting capacity. After adjusting the parameters for the piezoelectric actuator 8 and internal generator 9, if the spindle bearing 11 rotation speed increases and the bearing preload becomes too high (such as at high-speed machining operation), the internal generator 9, because of higher rotation speed of the shaft 12, will generate greater electric field intensity in the piezoelectric actuator along the bearing 11 radial direction, and result in a selected contraction of the piezoelectric actuator 8 in the bearing axial direction. When the piezoelectric actuator 8 is contracted axially, the axial thrust force of the first spacer ring 71 against the bearing outer ring 111 will be decreased. Consequently bearing 11 preload will become lower and may result lower rigidity for the shaft 12 so that the machine tool may maintain desirable machining precision when the shaft 12 rotates at high speed. Furthermore, when the shaft 12 rotates at high speed, the piezoelectric actuator 8 has an extension in bearing 11 radial direction. Before the piezoelectric actuator 8 extends, it has a smaller space in the bearing 11 radial direction than the compartment space formed between the first and second ring 711 and 712. This extra space between the ring 711 and 712 will be available for the piezoelectric actuator 8 extending use. Hence the piezoelectric actuator 8 won't compress the first and second spacer ring 71 and 72 in the bearing radial direction and may prevent the spacer ring set 7 from damage. When the shaft 12 rotation speed decreases, voltage provided by the internal generator 9 also decreases. The piezoelectric actuator 8 will gradually restore to its initial form and provide the bearing 11 a higher preload value for giving the shaft 12 required rigidity at low speed.

It may thus be seen that the objects of the present invention set forth herein, as well as those made apparent from the foregoing description, are efficiently attained. While the preferred embodiment of the invention has been set forth for purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An active piezoelectric spindle bearing preload adjustment mechanism, comprising:
    a preload adjustment assembly located between an inner ring and an outer ring of two sets of bearing including a spacer ring set and a piezoelectric actuator located in the spacer ring set; and
    an internal generator disposed at a selected location in a spindle and driven by a rotary shaft for rotation;
    wherein rotation speed of the rotary shaft is changeable for the internal generator to generate selected amount of electric power and voltage for controlling extension length of the piezoelectric actuator whereby to change slide distance between the inner and outer ring for controlling bearing preload value.

2. The active piezoelectric spindle bearing preload adjustment mechanism of claim 1, wherein the spacer ring set includes a first spacer ring and a second spacer ring.

3. The active piezoelectric spindle bearing preload adjustment mechanism of claim 2 further having a gap located between the first spacer ring and second spacer ring.

4. The active piezoelectric spindle bearing preload adjustment mechanism of claim 2, wherein the first spacer ring includes a first ring and a second ring which form a compartment therebetween.

5. The active piezoelectric spindle bearing preload adjustment mechanism of claim 1, wherein the internal generator includes a coil and a magnet and is wired to a rectifier.

6. The active piezoelectric spindle bearing preload adjustment mechanism of claim 5, wherein the rectifier is a semiconductor rectifier.

7. The active piezoelectric spindle bearing preload adjustment mechanism of claim 5, wherein the magnet is mounted on the shaft and is rotated with the shaft, the coil is located in a stationary spindle front block corresponding to the magnet.

8. The active piezoelectric spindle bearing preload adjustment mechanism of claim 5, wherein the magnet is a permanent magnet.

9. The active piezoelectric spindle bearing preload adjustment mechanism of claim 1, wherein the spacer ring set is located between the bearings which are being disposed in a back-to-back assembly fashion.

10. The active piezoelectric spindle bearing preload adjustment mechanism of claim 9, wherein the spacer ring set is compressed between the back-to-back assembly bearings for providing the spindle an initial bearing preload before spindle rotation.

* * * * *